United States Patent
Elliott et al.

(10) Patent No.: US 11,003,722 B2
(45) Date of Patent: May 11, 2021

(54) CROWDSOURCING CONTENT ASSOCIATIONS IN A PROFILE-HOSTING SYSTEM

(71) Applicant: Microsoft Technology Licensing, LLC, Redmond, WA (US)

(72) Inventors: Paul Elliott, Woodinville, WA (US); Fernando Garcia Valenzuela, Oslo (NO); Alexey Volkov, Oslo (NO); Kjetil Krogvig Bergstrand, Kolbotn (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 260 days.

(21) Appl. No.: 16/021,233

(22) Filed: Jun. 28, 2018

(65) Prior Publication Data

US 2020/0004879 A1    Jan. 2, 2020

(51) Int. Cl.
*G06F 16/951* (2019.01)
*G06Q 50/00* (2012.01)
*G07C 13/00* (2006.01)

(52) U.S. Cl.
CPC .......... *G06F 16/951* (2019.01); *G06Q 50/01* (2013.01); *G07C 13/00* (2013.01)

(58) Field of Classification Search
None
See application file for complete search history.

(56) References Cited

U.S. PATENT DOCUMENTS

| | | |
|---|---|---|
| 9,098,819 B1 | 8/2015 | Korula et al. |
| 2013/0110776 A1 | 5/2013 | Nunez diaz et al. |
| 2013/0217365 A1 | 8/2013 | Ramnani |
| 2013/0318085 A1 | 11/2013 | Pepper |
| 2014/0289342 A1 | 9/2014 | Turakhia |
| 2015/0074254 A1 | 3/2015 | Vinner |
| 2016/0088030 A1 | 3/2016 | Banatwala et al. |
| 2016/0335367 A1 | 11/2016 | Wang et al. |
| 2016/0352860 A1 | 12/2016 | Deb et al. |
| 2017/0039505 A1 | 2/2017 | Prabhakara et al. |
| 2017/0061357 A1 | 3/2017 | Dubey et al. |
| 2017/0236094 A1 | 8/2017 | Shah |

(Continued)

OTHER PUBLICATIONS

"Cloze", Retrieved From https://www.cloze.com/, Apr. 24, 2018, 4 Pages.

(Continued)

*Primary Examiner* — Giuseppi Giuliani
(74) *Attorney, Agent, or Firm* — Shook, Hardy & Bacon, L.L.P.

(57) ABSTRACT

A computer-implemented method for determining a crowdsourced association between a first user identifier, and a second user identifier for a user of a service accessible over a network. Service data are searched to identify users of the service having a potential association with the first user identifier. Users of the service are invited in turn to select one of the identified users in relation to the first user identifier. A tier of linkage is determined, from at least two defined tiers, between a user making the selection and the selected user. A vote is recorded, of the determined tier, for the selection. A threshold is assigned to votes according to the tier of linkage so that if the votes of at least one of the defined tiers achieves its assigned threshold, it may be determined whether the first user identifier is associated with the respective second user identifier.

19 Claims, 4 Drawing Sheets

(56) References Cited

U.S. PATENT DOCUMENTS

2017/0364996 A1   12/2017   Ventani et al.
2018/0053224 A1   2/2018   Mcclave et al.

OTHER PUBLICATIONS

"International Search Report and Written Opinion Issued in PCT Application No. PCT/US2019/037578", dated Aug. 13, 2019, 13 Pages.

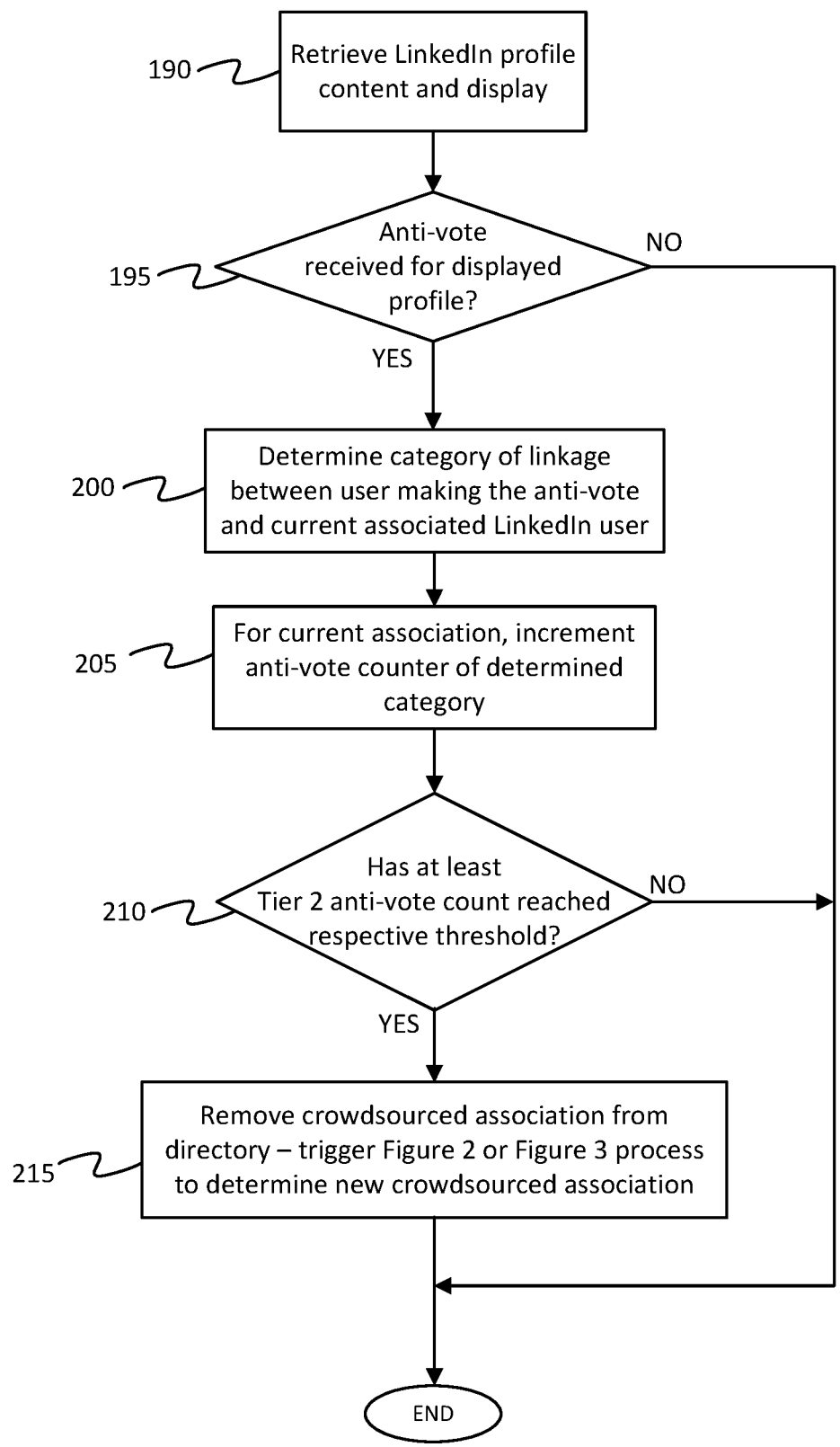

CROWDSOURCING CONTENT ASSOCIATIONS IN A PROFILE-HOSTING SYSTEM

TECHNICAL FIELD

The present disclosure relates to a computer-implemented method and to a computer program product.

SUMMARY

According to examples disclosed herein, there is provided a computer-implemented method for determining a crowdsourced association between a first user identifier and a second user identifier. The second user identifier is an identifier for a user of a service accessible over a network.

According to the method, and responsive to an event identifying the first user identifier, a search of data associated with users of the service is performed to identify one or more users of the service having a potential association with the first user identifier, each of the one or more identified users of the service having a respective second user identifier. One of a plurality of users of the service is then invited to select one of the one or more identified users in relation to the first user identifier.

Responsive to a selection by the said user, a tier of linkage is determined, from at least two defined tiers of linkage, between the said user and the one of the one or more identified users selected by the said user. A vote is then recorded, of the determined tier of linkage, in respect of the one of the one or more identified users, having a respective second user identifier, selected in relation to the first user identifier.

This process is then repeated in respect of different ones of the plurality of users of the service.

A respective threshold is assigned to the votes recorded according to the tier of linkage of the votes so that, responsive to a number of the recorded votes of at least one of the at least two defined tiers of linkage achieving the respective assigned threshold, it may be determined whether or not the association between the first user identifier and the respective second user identifier is a crowdsourced association.

BRIEF DESCRIPTION OF THE DRAWINGS

To assist understanding of the present disclosure and to show how example embodiments may be put into effect, reference is made by way of example to the accompanying drawings in which:

FIG. 4 is a flow diagram of an example variation to the crowdsourcing process represented in FIG. 2 or FIG. 3, according to the present disclosure.

DETAILED DESCRIPTION

It is increasingly common for an enterprise or other group of users to subscribe to cloud-based information technology (IT) services. The IT services provided may include access to cloud-sourced products such as Office 365° by Microsoft®, communications products for communication within and outside the enterprise such as Skype for Business®, cloud-hosted data storage, and back-up and data security as implemented by the cloud services provider. Such an arrangement enables the enterprise to simplify their internal IT systems and management processes. An example of an IT services arrangement is shown in FIG. 1.

Figure 1:
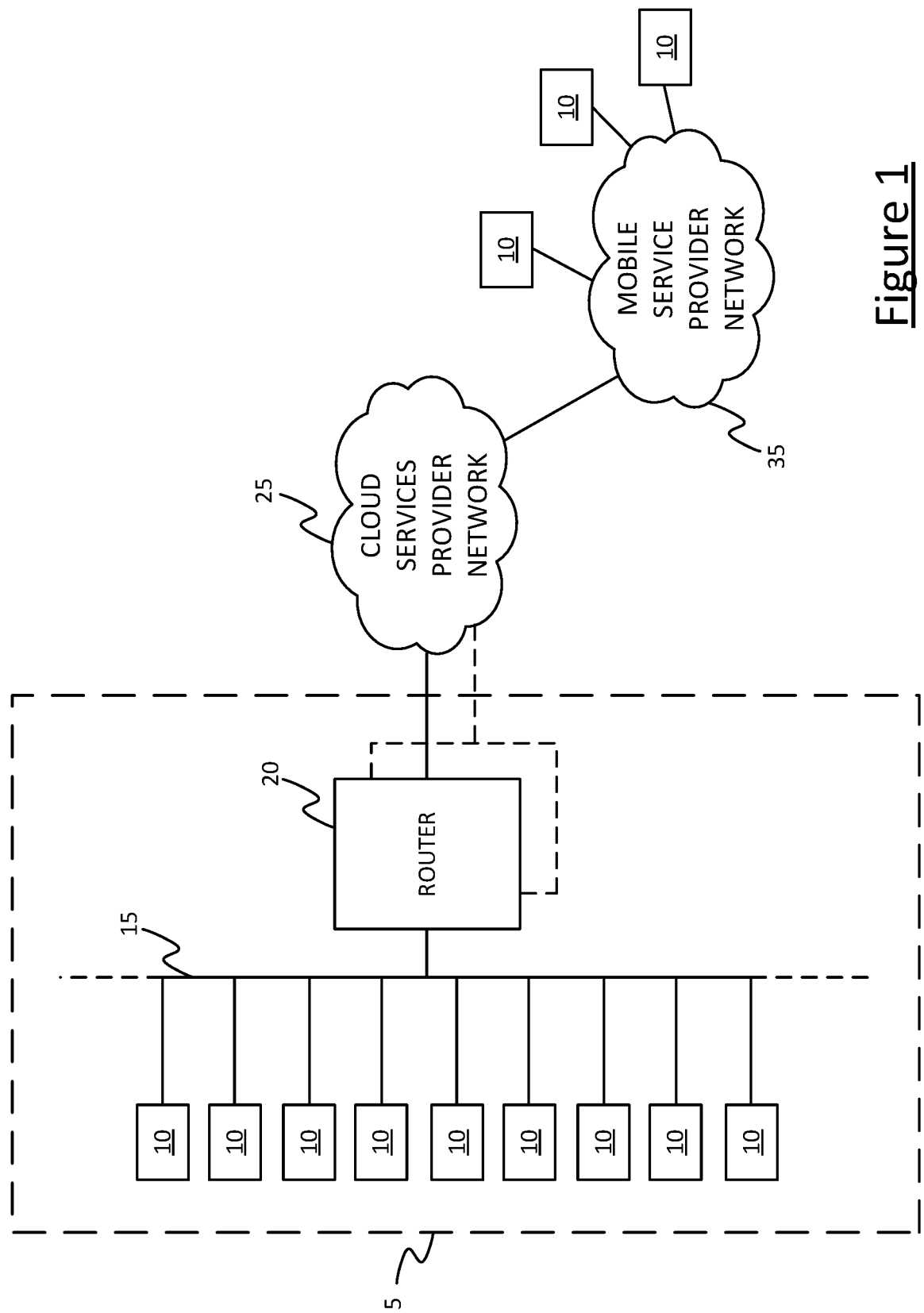
FIG. 1 shows one example of a computing network infrastructure enabling user terminal devices to access computer services provided via a cloud services provider network and in which examples disclosed herein may be implemented.

Referring to FIG. 1, an enterprise location 5 may host a number of users, from small groups of less than ten users to thousands of users. An enterprise may have a number of different locations 5, each hosting a number of users. Each user may be provided with one or more user terminal devices 10 such as a desk-top, lap-top, tablet or mobile phone device, arranged with access to a conventional internal enterprise network 15 for the location 5. The terminal devices 10 may be linked, through the enterprise network 15, by physical connection or by wireless connection ('Wi-Fi') to one or more routers 20. Each router 20 may be linked by a conventional network services provider network (not shown in FIG. 1) to a cloud services provider network 25. Mobile terminal devices 10 may also be configured by the enterprise to link to the enterprise's cloud-hosted services (25) via a conventional mobile services provider network 30 when not within Wi-Fi range of the enterprise network 15 and router 20.

Users hosted at the location 5 may each be registered for access to the enterprise's cloud-hosted IT services. Each user follows a log-in procedure at their terminal device 10 to gain access to cloud-hosted services of the enterprise using an enterprise user identifier that uniquely identifies the user within the enterprise. Typically, the unique identifier is an e-mail address for the user within the enterprise, or a unique 'alias' which may be used as a user ID for the user or as part of the user's e-mail address within the enterprise. Other types of identifier may also be used to enable direct contact with the user within the enterprise, such as a telephone number or Skype® identifier. Having logged-in to cloud-hosted services, the user is then able to access any of the cloud-hosted products to which the enterprise or the user, as an individual, has subscribed. Such products may include the Microsoft Office 365® suite of products, including an e-mail service for the enterprise, Skype for Business® and access to products such as LinkedIn® or other user profile-hosting products accessible through the cloud services provider network 25.

In the specific example of a Microsoft cloud services offering, an enterprise or other closed group of users is known as a 'Tenant'. The closed group of users registered by the tenant for access to cloud-hosted services to which the enterprise subscribes is known collectively as a 'Tenancy'. Each tenancy user logs-in to access cloud-hosted services configured for the tenant using a unique tenancy user identifier. The terms 'tenant' and 'tenancy' will be used in the present application in describing example implementations of the ideas described herein. However, the terms 'tenant' and 'tenancy' are not intended in the description that follows to infer a limitation to cloud-hosted IT services. Such terms may equally well be used to refer to any enterprise or other group of users having access to IT services over a network, whether a local network of the enterprise or a network operated by an IT services provider.

It is common for many of the users in a tenancy to have a LinkedIn account or other profile-hosting service account. However, a user will generally access their LinkedIn or other account by logging in with a personal identifier, e.g. a personal e-mail address or a personally chosen user ID, rather than with the e-mail address, alias or other identifier allocated to identify the user within the tenancy. Each user of LinkedIn will generally construct and store a profile of information about themselves. Each user determines, by stored preferences, who may see their profile and how much of their profile content may be seen by different categories of user within or from outside LinkedIn.

Users within a tenancy may benefit from being able to access LinkedIn profile content stored by other users in the tenancy, for example when the tenancy user identifier of another user is displayed. For example, if a user moves their on-screen cursor to 'hover' over a displayed tenancy e-mail address or alias of another user, it may be useful to obtain and display LinkedIn or other profile content for that other user. However, given that users generally operate their LinkedIn accounts so that they remain separate from the enterprise employing them, it can be difficult to associate a tenancy user identifier with the respective user's LinkedIn or other profile-hosting service identifier and so to access that user's profile.

One possible approach to associating respective user identifiers is to perform a direct comparison of a tenancy identifier with an identifier, e.g. an e-mail address, used by the respective user to log-in to LinkedIn. However, as suggested above, only a relatively small percentage of LinkedIn users use their tenancy user ID to identify themselves when logging in to LinkedIn and so a direct comparison would yield a limited set of associations.

According to the present disclosure, a 'crowdsourcing' technique is used to determine associations between a tenancy user identifier, e.g. a tenancy e-mail address, alias or other direct contact identifier allocated to a tenancy user for purposes associated with the tenant organization, and a LinkedIn or other profile-hosting service account personal to the user. Provided a user grants permission within LinkedIn for other users within the tenancy to access some or all of their LinkedIn profile content, a 'crowdsourced association' of the respective identifiers enables profile information to be shared with the other tenancy users based only upon the user's tenancy user identifier. Users would not need to know, e.g. the LinkedIn identifier of another tenancy user in order to benefit from sight of the other user's LinkedIn profile.

For the purposes of the present disclosure, 'crowdsourcing' comprises inviting users within the closed user group of a tenancy, or a wider group of users, when another user's tenancy user identifier, e.g. their tenancy e-mail address or alias, is displayed, to vote by selecting from a candidate list of LinkedIn identifiers or profiles potentially matching the other user's tenancy user identifier. The votes for each candidate association are recorded and analyzed to determine whether a crowdsourced association has been made.

An example of a crowdsourcing technique according to embodiments described herein will firstly be described with reference to FIG. 2. In this example, the technique may be applied as a process that operates gradually during normal use of the IT facilities provided under the tenancy. Alternatively, the technique may be applied as a bulk process to be operated by a group of users in an attempt to generate crowdsourced associations for users known (linked) to at least a sufficient number of the group, in one or more tranches. The technique will be described in the specific example context of determining associations with user identifiers of users of the LinkedIn service. However, it will be clear that the same technique may be applied, with appropriate variations, to other profile-hosting services accessible by users over a network.

Figure 2:
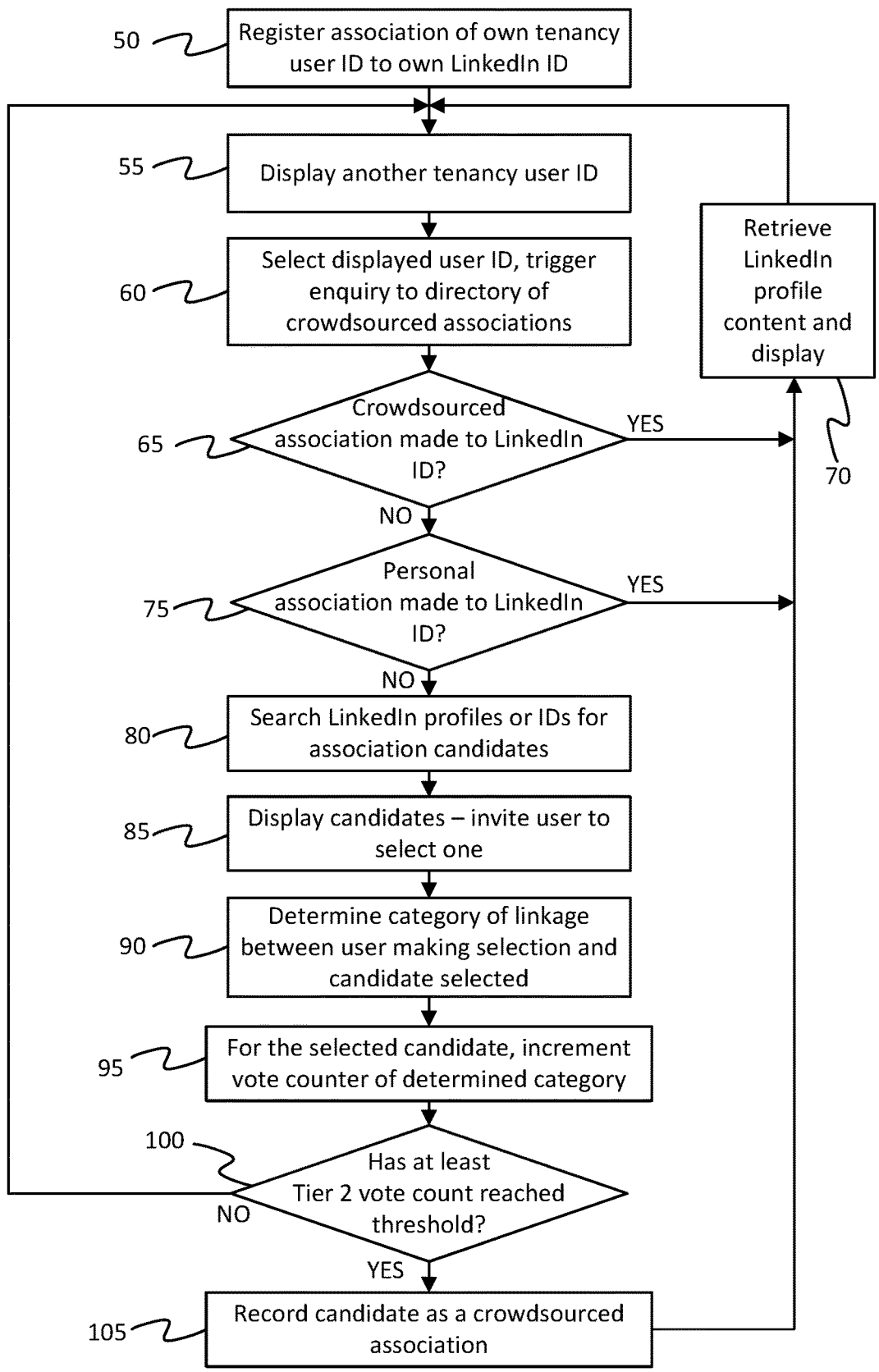
FIG. 2 is a flow diagram for an example crowdsourcing process according to the present disclosure.

Referring to FIG. 2, a flow chart shows an example of a crowdsourcing process according to the present disclosure. The crowdsourcing process shown in FIG. 2 is designed to construct a directory of crowdsourced associations between tenancy user identifiers and identifiers used to identify the same users in LinkedIn or other profile-hosting services. As crowdsourced associations are determined and recorded in the directory, respective user profile information may be retrieved and made available whenever a user selects a displayed tenancy user identifier.

The process begins at 50 with a user registering, in the directory of crowdsourced associations, a link between their own tenancy user identifier and their own LinkedIn identifier. This is intended to ensure that any connection between the tenancy user and other tenancy users of the LinkedIn service, as defined within LinkedIn, can be determined as required. Without performing this step, a user will be assumed to have no connection with other users of the LinkedIn service. In some applications of the present invention, it may be determined that a tenancy user is not permitted to participate in the crowdsourcing process without also being a user of the LinkedIn service and without also having registered the link between their respective identifiers in the directory. The user may also ensure at this stage that they have given permission in LinkedIn for other tenancy users to share some or all of the profile content the user has stored in LinkedIn. This initial stage of the process may occur as an ad-hoc exercise to prompt users, in response to particular events, to register their own association of identifiers. The crowdsourcing process would be expected to operate more successfully if a sufficiently large or sufficiently well connected sample of users within the tenancy register their own associations and therefore participate fully in the process.

At 55, an event occurs in which a tenancy user identifier for another user is displayed. As discussed above, the displayed identifier may typically comprise an e-mail address, alias or other unique identifier allocated to identify the other tenancy user. The identifier may be displayed, for example, when a user is selecting a recipient for an e-mail, a meeting invitation, an instant message or an IP phone call from a 'People Card' or other online directory of tenancy users. Alternatively, a user may receive an e-mail, meeting request, instant message or IP phone call from another tenancy user and the other tenancy user's identifier is displayed, for example as the sender.

At 60, the user indicates selection of the displayed identifier. The user's indication may for example comprise 'clicking' on the displayed identifier, positioning a displayed cursor over the displayed identifier, or some other indication of selection of the displayed identifier. The indicated selection triggers an enquiry to a directory of crowdsourced associations to determine whether a crowdsourced association has already been established linking the displayed identifier with a user identifier for a LinkedIn account of another tenancy user. Such an association would enable access to a LinkedIn profile for the other tenancy user.

At 65, if a crowdsourced association is recorded in the directory linking the displayed identifier to a LinkedIn identifier for the other user then, at 70, profile content associated with the other user, having the displayed identifier, is retrieved and displayed. The process then returns to 55 for the display of another tenancy user identifier.

If, at 65, a respective crowdsourced association has not yet been determined then, at 75, if a personal association has been recorded by the user selecting the displayed tenancy user identifier to a LinkedIn or other profile-hosting service identifier of another user then, at 70, profile content associated with the other user, having the displayed identifier, is retrieved and displayed. This scenario would typically arise if the other user has not indicated permission to share their LinkedIn or other profile with other tenancy users but the user making the personal association is, for example, directly linked to and known by the other user within LinkedIn or other profile-hosting service.

If, at 75, the user has not made a personal association of the displayed user identifier to another user then, at 80, a search is made for LinkedIn or other profile-hosting service profiles or identifiers as candidates for association with the displayed identifier. Alternatively, the results of a previously performed search are retrieved. Ideally, the search will return a relatively small set of between one and five candidate profiles or identifiers. At 85, the candidates identified by the search are displayed to the user. The candidate may be displayed for example in the form of full user profiles retrieved from LinkedIn, as portions of user profiles such as an associated image, or as hyperlinks to user profiles which the user may select as required. The user is invited to select one of the displayed candidates if the user has reason to believe it is associated with the displayed identifier.

At 90, the user having made a selection from the displayed candidates, it is determined whether there is any link, as defined within LinkedIn or otherwise, between the user making the selection and the candidate LinkedIn user selected. To achieve this, an enquiry may be made to LinkedIn to retrieve any connectivity information linking the user making the selection, identified by their already-registered association to their LinkedIn user identifier, and the candidate they have selected. If the user making the selection is linked directly or via one other user of LinkedIn to the selected candidate user, then the user making the selection is categorized as a 'Tier 2' user in respect of the association. Otherwise, the user making the selection is categorized as a 'Tier 1' user in respect of the association. A tier 2 user is considered, through their closer linkage, to be a more reliable voter for the association than a tier 1 user.

The criteria for defining a tier of linkage may typically be determined by experimentation and may vary from once tenancy to another according to how well people know each other. For example a tier 2 linkage may be extended to include users linked by up to two 'hops' to the selected candidate. Other criteria for assigning a tier 2 linkage to a user making a selection will be discussed below.

At 95, having determined the category of linkage between the user making the selection and the candidate user selected, a vote counter stored in the directory of crowdsourced associations, or in a separate vote store, is incremented for the selected association in and for the determined category of linkage. Two vote counters are stored for each recorded association between a tenancy identifier and a candidate LinkedIn identifier; one vote counter for tier 1 user votes; and one vote counter for tier 2 user votes. Votes recorded in the tier 2 vote counter are assigned a greater weighting than votes recorded in the tier 1 vote counter when determining whether sufficient votes have been accumulated to determine that the association is a crowdsourced association result. The difference in weighting may be represented for example by a different threshold value assigned to each vote counter. The tier 2 vote counter is assigned a lower vote threshold value than the tier 1 vote counter so that a smaller number of tier 2 votes are required to determine a crowdsourced association result than tier 1 votes. For example the tier 2 vote threshold may be set at 2 votes and the tier 1 vote threshold may be set at 5 votes. However, a recorded association may only be determined as a crowdsourced result if at least the tier 2 vote threshold is achieved. Alternatively, a recorded association may only be determined as a crowdsourced result if both the tier 2 and the tier 1 vote thresholds are achieved.

In an alternative weighting scheme, when analyzing the accumulated votes, the number of votes accumulated by each vote counter may be multiplied by a different weighting. The weighting assigned to the number of tier 2 votes may be greater than the weighting assigned to the number of tier 1 votes. The threshold for the total weighted vote count for each of tier 2 and tier 1 may then be set to the same value or a different value. As above, a recorded association may only be determined as a crowdsourced result if at least the weighted total of tier 2 votes achieves the threshold. Alternatively, a recorded association may only be determined as a crowdsourced result if the weighted total of both the tier 2 and the tier 1 votes achieve the threshold. As an example, the weighting for multiplying the tier 2 votes may be set at 2 while the weighting for multiplying the tier 1 votes may be set at 5. The threshold level for the total weighted vote count for each tier may then be set at 10.

Therefore at 100, if at least the tier 2 vote count (or weighted vote count) achieves the predetermined threshold value then, at 105, the association is recorded as a crowdsourced association in the directory of crowdsourced associations. Processing then passes to 70 to retrieve and display LinkedIn profile content for the now-determined crowdsourced association.

If, at 100, the tier 2 vote count (or weighted vote count) has not achieved the predetermined threshold value, then processing returns to 55.

In an optional variation to the process described above with reference to FIG. 2, a user may be provided with the option to register a so-called 'anti-vote' against any particular search result candidate. That is, when search results are displayed at 85, a user may, instead of making a positive association between the displayed identifier and one of the displayed candidates for association, know that one or more of the displayed candidates is not associated with the displayed identifier. This variation to the process of FIG. 2 to capture anti-votes will now be described with reference to FIG. 3.

Figure 3:
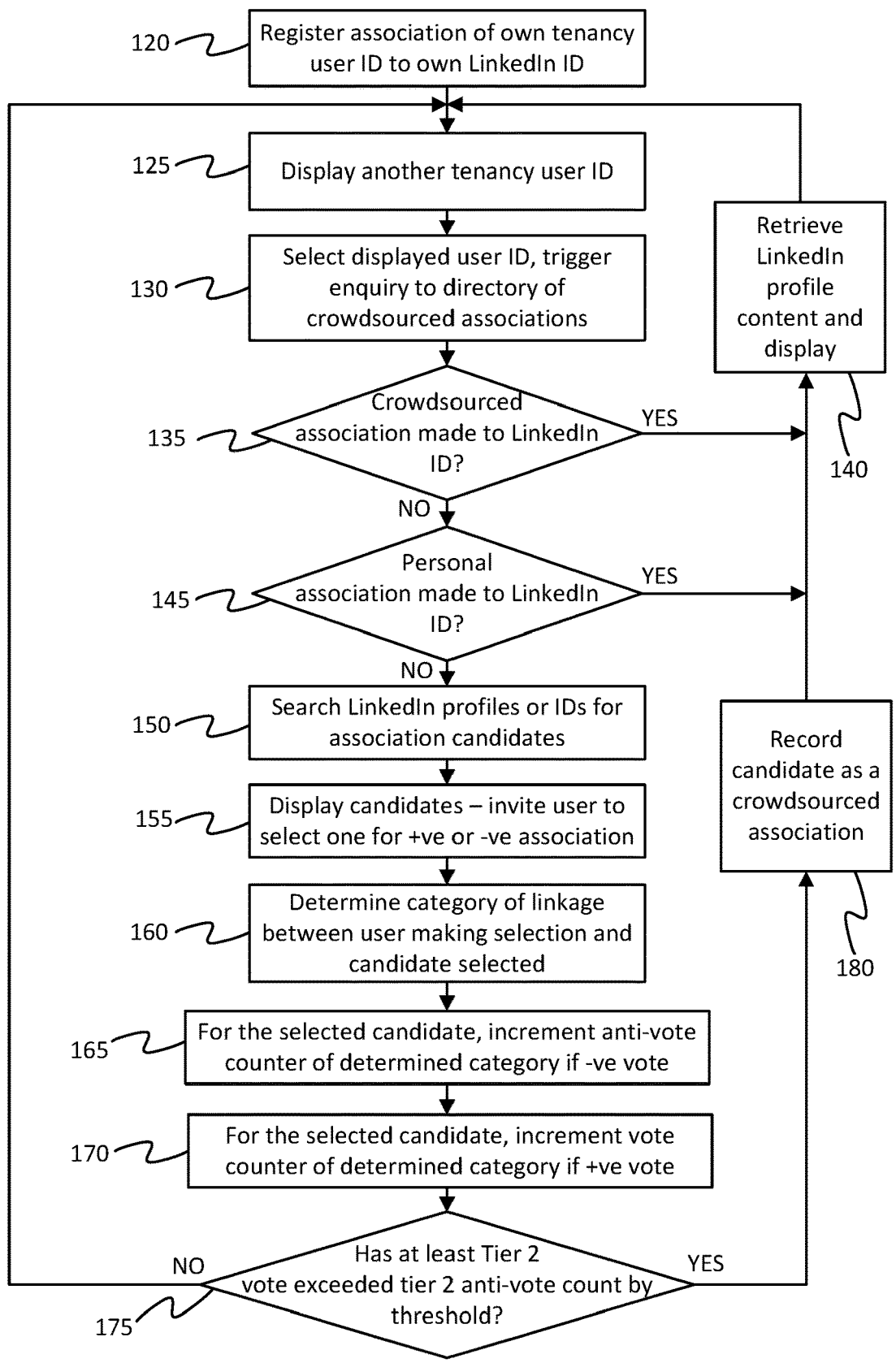
FIG. 3 is a flow diagram for another example crowdsourcing process according to the present disclosure.

Referring to FIG. 3, a crowdsourcing process similar to that for FIG. 2 is shown. The stages 120 to 150 correspond to the stages 50 to 80 in FIG. 2. However, in place of 85 in FIG. 2, the process of FIG. 3 comprises, at 155, displaying search results and inviting the user to select one or more of the displayed results as a positive (+ve) or negative (−ve) vote, a negative vote being referred to in the following as an 'anti-vote' to indicate that the search result candidate is not associated with the displayed identifier. The user may at this stage select one or more of the displayed candidate profiles on which to register a positive vote or an anti-vote.

At 160, similarly to 90 for the process of FIG. 2, the category of linkage between the user making the one or more selections and each of the one or more selected candidate users is determined; whether tier 2 or tier 1 for each selection. At 165, if the user has made an anti-vote for one or more selected associations then an anti-vote counter is incremented for the determined category for each selected candidate association. As for the positive votes, for each association, a vote counter is provided for anti-votes by tier 2 users and a vote counter for anti-votes by tier 1 users. Similarly, at 170, as for 95 in FIG. 2, if the user has made a positive vote for a selected candidate association then the respective vote counter is updated for the determined category for the selected candidate association.

To achieve a crowdsourced association result in the process of FIG. 3, the total of at least the positive tier 2 votes is required to exceed the total number of anti-votes in that category by the respective threshold. Alternatively, the totals of the positive votes for the tier 1 and the tier 2 votes are each required to exceed the totals of anti-votes in the same category by the respective thresholds. Considering the example given above, if the threshold for positive tier 2 votes is 2 and for tier 1 votes is 5, and there is one tier 2 anti-vote and 5 tier 1 anti-votes then, if no more anti-votes are received, the number of tier 2 positive votes needs to reach 6 and the number of tier 1 positive votes needs to reach 11 for a crowdsourced association to be recorded.

Therefore, at 175, if at least the tier 2 vote count exceeds the number of anti-votes for a given candidate association by the tier 2 threshold then, at 180, a crowdsourced result has been determined and the directory is updated to record the candidate association as a crowdsourced association between the displayed tenancy user identifier and a respective LinkedIn identifier. The process then, at 140, retrieves the profile of the LinkedIn identifier now-determined as a crowdsourced association, and displays it to the user.

The processes described above with reference to either FIG. 2 or FIG. 3 may each be used to generate a directory of crowdsourced associations. The directory may be accessed as a common resource within a tenancy by applications in which tenancy user identifiers are used, enabling useful profile information to be retrieved and displayed. However, associations are likely to change over time, for example if a user changes their LinkedIn account identifier without also triggering an update to the directory of crowdsourced associations. A further process may therefore be implemented to allow users to trigger corrections to crowdsourced associations. Such a process may also be used for example where such users have not previously contributed to the votes that resulted in a crowdsourced association being made and wish to register a vote of disagreement. One example of such a correction process will now be described with reference to FIG. 4.

Referring to FIG. 4, the correction process may be triggered after 190, corresponding to 70 in the FIG. 2 process or 140 in the FIG. 3 process, when a retrieved LinkedIn profile has been displayed on the basis of a current crowdsourced association with a displayed tenancy user identifier. A profile is retrieved and displayed at 190 may include a check-box which a user may select to indicate that the displayed profile is not the correct profile for the displayed tenancy user identifier. That is, by selecting the check-box the user may register an anti-vote to the displayed profile association. Furthermore, selecting the check-box may, in one example embodiment, trigger the process of FIG. 2 or FIG. 3 to identify alternative candidates for the association and to capture a vote for one of those. Alternatively, if the user knows what the correct association should be for the displayed tenancy user identifier, the user may identify and enter a vote for the correct association. Other ways for the user to indicate an anti-vote would be apparent to a person or ordinary skill in the relevant art.

If, at 195, the user has registered an anti-vote then, at 200, as for 90 in the FIG. 2 process or 160 in the FIG. 3 process, it is determined whether there is any link, as defined within LinkedIn or otherwise, between the user registering the anti-vote for the current crowdsourced association and the associated LinkedIn user. The determined link is used to categorize the user registering the anti-vote as a Tier 2 or a Tier 1 user in respect of the association, as defined above. A tier 2 user is considered, through their closer linkage, to be a more reliable voter for determining whether or not the displayed profile is correctly associated with the displayed tenancy user identifier. Otherwise, at 195, if an anti-vote is not indicated, then the corrections process ends as regards a currently displayed profile.

At 205, having determined the category of linkage between the user making the anti-vote and the associated user, an anti-vote counter is incremented of the determined category of linkage for the currently recorded crowdsourced association. Two anti-vote counters are stored, in the directory or only in a separate vote store specific to the user making the anti-vote: one anti-vote counter for tier 1 user anti-votes; and one anti-vote counter for tier 2 user anti-votes. Anti-votes recorded in the tier 2 anti-vote counter are assigned a greater weighting than anti-votes recorded in the tier 1 anti-vote counter when determining whether sufficient anti-votes have been accumulated to determine that the association is no longer to be recognized as a crowdsourced association. The difference in weighting may be represented for example by a different threshold value assigned to each anti-vote counter, as for the positive votes. The tier 2 anti-vote counter is assigned a lower vote threshold value than the tier 1 anti-vote counter so that a smaller number of tier 2 anti-votes are required to cancel a crowdsourced association result than tier 1 anti-votes. For example the tier 2 anti-vote threshold may be set at 2 anti-votes and the tier 1 anti-vote threshold may be set at 5 anti-votes. However, a recorded association may only be cancelled as a crowdsourced association if at least the tier 2 anti-vote threshold is achieved. Alternatively, a recorded association may only be cancelled as a crowdsourced association if both the tier 2 and the tier 1 anti-vote thresholds are achieved.

Therefore, at 210, if at least the tier 2 anti-vote count achieves the predetermined threshold value then, at 215, the recorded association is removed from the directory as a crowdsourced association. The FIG. 2 or FIG. 3 process may then be triggered to determine a new crowdsourced association for the respective tenancy user identifier, beginning for example at 80 in the FIG. 2 process or at 150 in the FIG. 3 process, and the correction process ends as regards a currently displayed profile. Otherwise if, at 210, at least the tier 2 anti-vote count has not achieved the predetermined threshold value then the process ends as regards a currently displayed profile.

In an example implementation, participation of users in the process described above with reference to FIG. 4 may be restricted to those users who have not previously contributed to the votes that resulted in the displayed crowdsourced association with a LinkedIn profile. In this way, opportunities for abuse of the voting system may be reduced by preventing both positive and negative votes being cast by the same user. Further control over anti-votes may also be applied by storing anti-votes only in storage specifically set aside for the user making the anti-vote. Such votes may then be taken into account when deciding whether or not to remove a crowdsourced association from the directory subject to predetermined criteria regarding the user or users making the anti-votes and their earlier participation in achieving the crowdsourced association.

As a result of executing the processes of FIG. 2 or FIG. 3 and FIG. 4, the situation may arise where the directory has accumulated sufficient positive votes for associations between a given tenancy user identifier and two different candidate LinkedIn profiles such that the votes for each association exceed the respective anti-vote numbers by the relevant thresholds. In that event, if the numbers of anti-votes differ, the association candidate having the smallest number of anti-votes will be recorded as the crowdsourced association for the given tenancy user identifier. Alternatively, a third tier of linkage may be defined for use by one or more administrators or arbitrators to record a more highly weighted vote in favor of one or other association. Their vote counter may then be used in determining which association candidate is to be defined as the crowdsourced association for a given tenancy user identifier.

In a practical implementation of the processes described above, the crowdsourcing directory may be stored as a centrally hosted and widely accessible resource to which requests for access to profile information may be submitted by users in a respective tenancy. Access to the directory may be restricted to users of the tenancy, or it may be made more widely accessible according to the recorded preferences of a respective tenant organization. The directory may be hosted for example within a cloud service, as in the IT architecture described above with reference to FIG. 1. Alternatively, the directory may be stored on another type of server, for example one hosted by another type of network services provider, or on a server located at the location 5 and operated by the tenant organization. Alternatively, the directory may be replicated from a single master copy of the directory and stored in multiple locations. Regular updates may be made to the copies of the directory according to a configuration appropriate to the end users of the directory.

When users register votes or anti-votes, for example when operating according to the processes in FIG. 2, 3 or 4, the votes may be communicated directly to a centrally hosted store for use in incrementing the respective vote or anti-vote counters. Alternatively, the vote or anti-vote counters may be stored more locally to the tenant organization and the accumulated votes uploaded to a central store at predetermined times. The vote counters may be stored as part of the directory of crowdsourced associations together with the respective candidate associations or they may be stored in a separate store, either as a resource specific to a tenant organization or as a more widely accessible resource, according to the preferences recorded for the tenant organization.

As an operating principle, a single authority is established for making updates to the directory of crowdsourced associations. The single authority may add new crowdsourced associations to the directory, determined according to the results of analysis of recorded votes and anti-votes by the methods described above with reference to FIG. 2 or FIG. 3. The single authority may also remove crowdsourced associations from the directory according to the process described above with reference to FIG. 4. The single authority may also record personal associations in the directory that have been made by particular users known to the users identified by the respective associations. In this way, a request to the directory by such a user to retrieve a profile based upon a personal association would be accepted if requested by the user making the personal association, but rejected otherwise. The single authority may also have exclusive access to the stored vote and anti-vote counters for use in determining which associations are to be recorded as crowdsourced associations and which are not. The single authority may store some or all types of association in the directory: personal associations; crowdsourced associations; and candidate associations, optionally with the associated vote counters, and apply appropriate controls over their use and access. The single authority may operate to analyze the vote counters according to a predetermined schedule, or in real time, to determine updates to the directory.

A software component may be implemented to embody the functions attributed above to the single authority. This software component will be referred to herein as a 'conflation service'. The conflation service may execute as a single instance of a cloud-hosted service. Alternatively, the conflation service may operate in a more distributed manner, as would be apparent to a person or ordinary skill in the relevant art. In particular, a single conflation service may be implemented in respect of all tenant organizations using the cloud-hosted IT services, configured to recognize the individual preferences of tenant organizations as mentioned above in updating and accessing the directory. Alternatively, a conflation service dedicated to serving a particular tenant organization may be implemented. The conflation service may operate to analyze all vote and anti-vote counters, wherever stored, when determining updates to a master directory of associations. Alternatively, the conflation service may access only a single master store of vote and anti-vote counters, relying upon upload of votes and anti-votes from the other stores to the master store when determining updates to the directory.

In configuring the conflation service, a set-up process may be implemented to determine the appropriate levels of the tier 2 and tier 1 user thresholds or weightings to be used at 100 in the FIG. 2 process, at 175 in the FIG. 3 process and at 210 in the FIG. 4 process for a particular tenant.

A monitoring process may be implemented, for example by the conflation service, to identify potential abuse of the crowdsourcing process. Examples of potential abuse may include a particular user being found to vote more than once for the same candidate association, being found to register deliberately false votes for a given association, etc. The monitoring process may measure a user's performance in terms of the number of candidate associations for which the user registered a positive vote and which were eventually determined by the conflation service as crowdsourced associations. Similarly, the monitoring process may measure the number of anti-votes registered for crowdsourced associations which were eventually removed from the directory. Those users found by the monitoring service to have a voting record consistent with the eventual determination of a crowdsourced association result or the removal of a crowdsourced result may be assigned a status of higher reliability to be taken into account by the conflation service when analyzing votes. For example, a reliable user may be assigned a Tier 2 category of linkage for all votes or anti-votes registered, irrespective of their determined category of linkage to other users. Similarly, those users found to be consistently voting counter to the determined crowdsourced association or removal may be assigned a Tier 1 category of linkage for all votes or anti-votes registered, irrespective of their determined category of linkage to other users.

To protect the privacy of a LinkedIn or other profile-hosting service user, if the user does not give permission for their profile content to be shared with other tenancy users then the process of FIG. 2 or FIG. 3 may continue to operate, but the search at 80 in the FIG. 2 process or at 150 in the FIG. 3 process will not identify or reveal the user as a candidate for association. Furthermore, the conflation service will not reveal such profile content linked by an association recorded in the directory unless the association is recorded as a personal association by a user requesting the profile content, as discussed above.

In a further variant, votes or anti-votes made by tenancy users for candidate associations involving a particular user may be recorded by vote and anti-vote counters held in a respective area of storage for the user. In this way, the conflation service may be configured to access such votes and anti-votes when updating the directory only in the event that the user gives the necessary permission for their profile content to be made available through a crowdsourced association. Similarly, if a user withdraws their consent to allow sharing of their profile content, the previously accumulated votes and anti-votes for associations involving that user will not be lost and will remain stored in the vote and anti-votes counters for associations involving that user.

In a cloud-hosted implementation of the crowdsourcing processes described above, the conflation service operates in respect of a particular tenant and the users registered for the tenancy. A single directory of crowdsourced associations and a single conflation service may be implemented in the cloud with partitioning of the directory by tenant. Alternatively, directories in respect of different tenancies may be stored separately. However, if a tenant agrees that votes of their tenancy users may be shared with other tenants hosted in the cloud, then the conflation service may take account of the increased pool of votes and anti-votes when determining the status of associations defined in the directory. This may be achieved by maintaining vote and anti-vote counters not only in respect of the different categories of linkage of a voting user to the respective candidate user, but also in respect of the tenancy from which the vote or anti-vote originates. The crowdsourcing processes of FIGS. 2, 3 and 4 may be triggered in respect of tenancy user identifiers of another tenant organization, when displayed for example in incoming e-mails from that other tenant organization. In this way, a larger directory of crowdsourced associations may be assembled and made available to tenants hosted in the cloud, recording associations to LinkedIn profiles or to profiles of other profile-hosting services accessible through the cloud. However, the conflation service may also be able to update the directory if a tenant subsequently withdraws permission for the votes of their users to be used in updating the directory.

In the event that a user decides to withdraw their permission for users in other tenancies to see their profile content, the conflation service may be configured to do one or more of: restrict access to the respective crowdsourced association to that user's fellow tenancy users; update the directory of crowdsourced associations to exclude votes for a particular association originating from users of other tenancies; or remove the crowdsourced association from the directory altogether. If a crowdsourced association is not yet determined, the conflation service may be configured to use only those votes and anti-votes recorded for associations involving users of the same tenancy when updating the directory for that tenancy.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

What is claimed is:

1. A computer-implemented method for determining a crowdsourced association between a first user identifier and a second user identifier, the second user identifier comprising an identifier for a user of a service accessible over a network, the method comprising:
   responsive to an event identifying the first user identifier, performing a search of data associated with users of the service to identify one or more users of the service having a potential association with the first user identifier, each of the one or more identified users of the service having a respective second user identifier;
   inviting one user of a plurality of users of the service to select one of the one or more identified users in relation to the first user identifier;
   responsive to a selection by the one user of the plurality of users, determining a tier of linkage, from at least two defined tiers of linkage, between the one user of the plurality of users and the one of the one or more identified users selected by the one user of the plurality of users;
   recording a vote, of the tier of linkage, in respect of the one of the one or more identified users in relation to the first user identifier;
   repeating the inviting, the determining a tier of linkage and the recording in respect of different ones of the plurality of users of the service;
   assigning a respective threshold to the votes recorded according to the tier of linkage of the votes;
   responsive to a number of the votes recorded of at least one of the at least two defined tiers of linkage achieving the respective assigned threshold, determining whether the association between the first user identifier and the respective second user identifier is a crowdsourced association;
   responsive to determining that the first user identifier and the respective second user identifier is a crowdsourced association, using the second user identifier to retrieve data stored in the service; and
   displaying the retrieved data.

2. The method according to claim 1, wherein the event comprises receipt by a user of the service of a message including the first user identifier.

3. The method according to claim 1, wherein the service is a profile-hosting service and inviting the one user of the plurality of users of the service to select one of the one or more identified users in relation to the first user identifier comprises displaying, to the one user of the plurality of users, profile data retrieved from the profile-hosting service for each of the one of more identified users.

4. The method according to claim 1, wherein the at least two defined tiers of linkage define different levels of linkage, as defined by the service, between the one user of the plurality of users and the one of the one or more identified users selected by the one user of the plurality of users.

5. The method according to claim 4, wherein the at least two defined tiers of linkage comprise: a first defined tier of linkage, wherein the one user of the plurality of users is directly linked, or linked via at least one other linked user of the service, to the one of the one or more identified users selected by the one user of the plurality of users; and a second defined tier of linkage, wherein the second user is not linked by the service according to the first defined tier with the one of the one or more identified users selected by one user of the plurality of users.

6. The method according to claim 5, wherein assigning a respective threshold to the votes recorded comprises assigning a larger threshold to the votes recorded according to the second defined tier of linkage than a threshold assigned to the votes recorded according to the first defined tier of linkage.

7. The method according to claim 1, wherein recording a vote comprises incrementing a respective vote counter of the tier of linkage in respect of the one of the one or more identified users in relation to the first user identifier.

8. The method according to claim 7, wherein the vote counters of each said defined tier of linkage are stored in a directory of crowdsourced associations.

9. The method according to claim 1, wherein recording a vote comprises storing, in a store reserved for the one user of the plurality of users, a record of the vote, a record of the tier of linkage determined for the vote, and a record of the one of the one or more identified users, having a respective second user identifier, selected by the one user of the plurality of users in relation to the first user identifier.

10. The method according to claim 1, wherein the vote comprises a positive vote for an association of the first user identifier with the one of the one or more identified users and wherein, responsive to a number of the votes recorded of at least one of the at least two defined tiers of linkage achieving the respective assigned threshold, determining that the association between the first user identifier and the respective second user identifier is a crowdsourced association.

11. The method according to claim 1, wherein the vote comprises an anti-vote for an association of the first user identifier with the one of the one or more identified users and wherein, responsive to a number of the votes recorded of at least one of the at least two defined tiers of linkage achieving the respective assigned threshold, determining that the association between the first user identifier and the respective second user identifier is not a crowdsourced association.

12. The method according to claim 1, wherein the vote comprises a positive vote or an anti-vote for an association of the first user identifier with the one of the one or more identified users and wherein:
   recording a vote comprises incrementing a respective vote or anti-vote counter, according to whether the vote is a positive vote or an anti-vote of the tier of linkage in respect of the association of the first user identifier with the one of the one or more identified users; and
   responsive to a number of the positive votes of at least one of the at least two defined tiers of linkage achieving the respective assigned threshold number of votes in excess of a number of the anti-votes recorded of the same said at least one of the at least two defined tiers of linkage, determining that the association between the first user identifier and the respective second user identifier is a crowdsourced association.

13. The method according to claim 1, wherein the first user identifier comprises an e-mail address.

14. The method according to claim 1, wherein the first user identifier comprises a telephone number.

15. The method according to claim 1, wherein the first user identifier comprises an alias assigned for use in accessing the network.

16. The method according to claim 1, wherein the one or more identified users of the service comprise a subset of users registered to access the network.

17. The method according to claim 1, comprising:
   responsive to an event identifying the first user identifier, the first user identifier having a determined crowdsourced association with a second user identifier, using the second user identifier to retrieve data stored in the service in respect of the second user identifier; and
   displaying to a user the retrieved data in association with the first user identifier.

18. The method according to claim 17, comprising:
   if the user considers that the retrieved data are not associated with the first user identifier, determining a tier of linkage, from the at least two defined tiers of linkage, between the user and the user of the service having the second user identifier; and
   recording an anti-vote, of the tier of linkage in respect of the crowdsourced association of the first user identifier with the second user identifier.

19. The method according to claim 18, comprising:
   repeating the using the second user identifier to retrieve data stored in the service, the displaying the retrieved data, the determining a tier of linkage between the user and the user of the service having the second user identifier and recording an anti-vote in respect of a plurality of users;
   responsive to a number of the anti-votes, of at least one of the at least two defined tiers of linkage, achieving a respective assigned threshold, determining that the crowdsourced association between the first user identifier and the second user is no longer a crowdsourced association.

* * * * *